(12) United States Patent
Hui et al.

(10) Patent No.: US 9,281,865 B2
(45) Date of Patent: Mar. 8, 2016

(54) EFFICIENT NETWORK DISCOVERY IN FREQUENCY HOPPING NETWORKS

(75) Inventors: Jonathan W. Hui, Foster City, CA (US); Lik Chuen Alec Woo, Union City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 1005 days.

(21) Appl. No.: 13/272,841

(22) Filed: Oct. 13, 2011

(65) Prior Publication Data

US 2013/0094536 A1    Apr. 18, 2013

(51) Int. Cl.
*H04B 1/713* (2011.01)

(52) U.S. Cl.
CPC ..................................... *H04B 1/713* (2013.01)

(58) Field of Classification Search
CPC ... H04W 24/10; H04W 28/06; H04W 76/002; H04L 41/12; H04L 41/0893; H04L 45/02
See application file for complete search history.

(56) References Cited

U.S. PATENT DOCUMENTS

| | | | |
|---|---|---|---|
| 6,088,591 A | 7/2000 | Trompower et al. | |
| 6,138,019 A | 10/2000 | Trompower et al. | |
| 6,882,851 B2 | 4/2005 | Sugar et al. | |
| 7,050,452 B2 | 5/2006 | Sugar et al. | |
| 2007/0088951 A1* | 4/2007 | Nakajima | 713/171 |
| 2008/0031208 A1* | 2/2008 | Abhishek et al. | 370/338 |
| 2009/0167536 A1* | 7/2009 | Clark et al. | 340/573.4 |
| 2010/0214995 A1* | 8/2010 | Iyer et al. | 370/329 |
| 2010/0316009 A1* | 12/2010 | Han et al. | 370/329 |
| 2014/0029470 A1* | 1/2014 | Ghanadan et al. | 370/254 |

OTHER PUBLICATIONS

Winter et al., "RPL: IPv6 Routing Protocol for Low Power and Lossy Networks" <draft-ietf-roll-rpl-19> (Mar. 13, 2011 version), pp. 1-85.
P. Levis, "The Trickle Algorithm", Internet Engineering Task Force, RFC 6206 (IETF); Mar. 2011, pp. 1-13.

* cited by examiner

*Primary Examiner* — Sulaiman Nooristany
(74) *Attorney, Agent, or Firm* — Parker Ibrahim & Berg LLC; James M. Behmke; Stephen D. LeBarron

(57) ABSTRACT

In one embodiment, a device in a frequency hopping communication network transmits responsive beacon messages based on adaptive types of responsive beacon message transmission based on a number of received beacon requests within a given time period: the number below a threshold results in synchronized unicast messages; the number above the threshold results in unsynchronized broadcast messages. In another embodiment, the device suppresses unsolicited beacon message transmission based on a density-aware redundancy count of other unsolicited beacon message transmissions from neighboring devices. In another embodiment, the device may transmit unsolicited beacon messages according to an adaptive interval based on stability of the network. In another embodiment, the device may suppress transmission of a beacon request to join the communication network based on a density-aware redundancy count of other beacon requests from neighboring devices, and transmits beacon requests at an adaptive interval that increases in response to each unanswered beacon request.

10 Claims, 21 Drawing Sheets

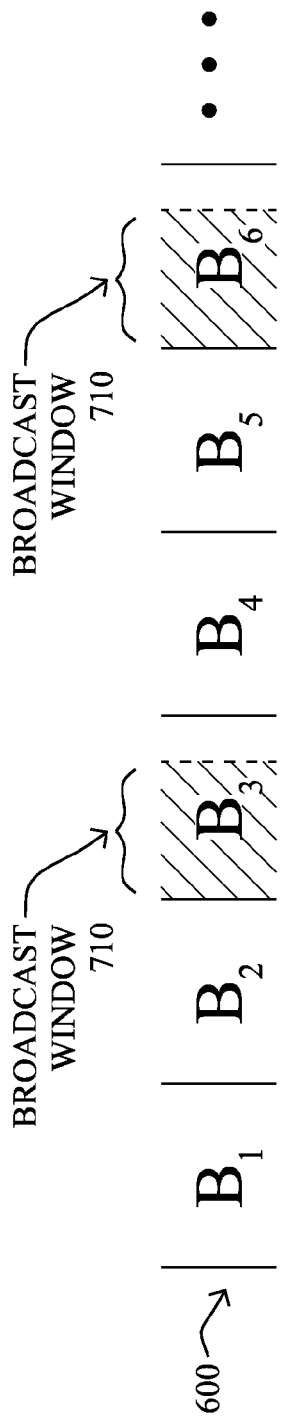
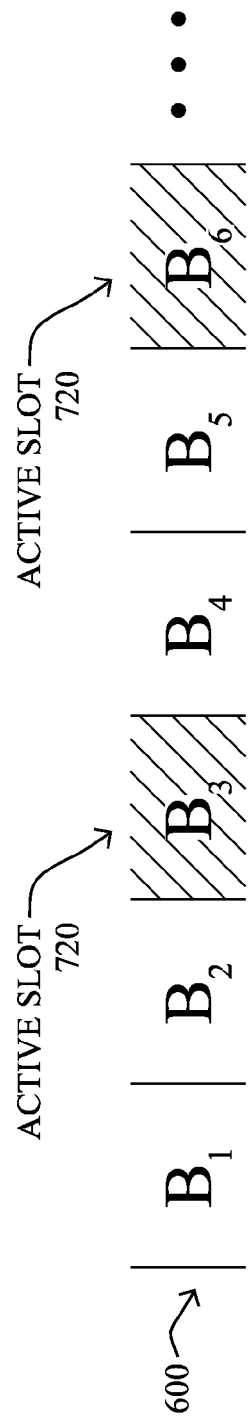
FIG. 7A
FIG. 7B

EFFICIENT NETWORK DISCOVERY IN FREQUENCY HOPPING NETWORKS

TECHNICAL FIELD

The present disclosure relates generally to wireless communication, and, more particularly, to network discovery in frequency hopping communication networks.

BACKGROUND

In a frequency hopping (or channel hopping) mesh network, devices communicate using different frequencies/channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Channel schedules may be assigned to each transmitter-receiver pair independently so that neighboring transmitter-receiver pairs can communicate simultaneously on different channels. Alternatively, all devices in a network may synchronize with a single channel schedule such that all devices transmit and receive on the same channel at any time.

A network discovery system generally requires two functions. First, a discovery protocol is needed between a device within a network and a device attempting to join the network that allows joining devices to passively listen or actively probe for neighboring networks. To support passive listening, devices in a network transmit beacons periodically to announce the presence of a network, while to support active probing, joining devices transmit messages to devices within the network to request a beacon transmission. Second, a network discovery system generally requires a dissemination protocol to communicate network-wide parameters used for the network join process to all devices in the network, such as a network name, access-control security parameters, and/or an indication of network size to allow load balancing across networks.

Current discovery protocols cannot utilize synchronized transmissions since the devices are not synchronized to the frequency hopping schedule of the network or any individual device within the network. Instead, the devices are forced to utilize more expensive unsynchronized transmissions. Also, having every node transmit network discovery beacons with a fixed period is problematic in dense environments since the channel utilization is proportional to network density. In addition, having all nodes that receive a beacon request respond to the request with a transmitted beacon results again in the channel utilization generated by the response being proportional to network density.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7B illustrate an example overlay broadcast schedule.

DESCRIPTION OF EXAMPLE EMBODIMENTS

Overview

Figure 1:
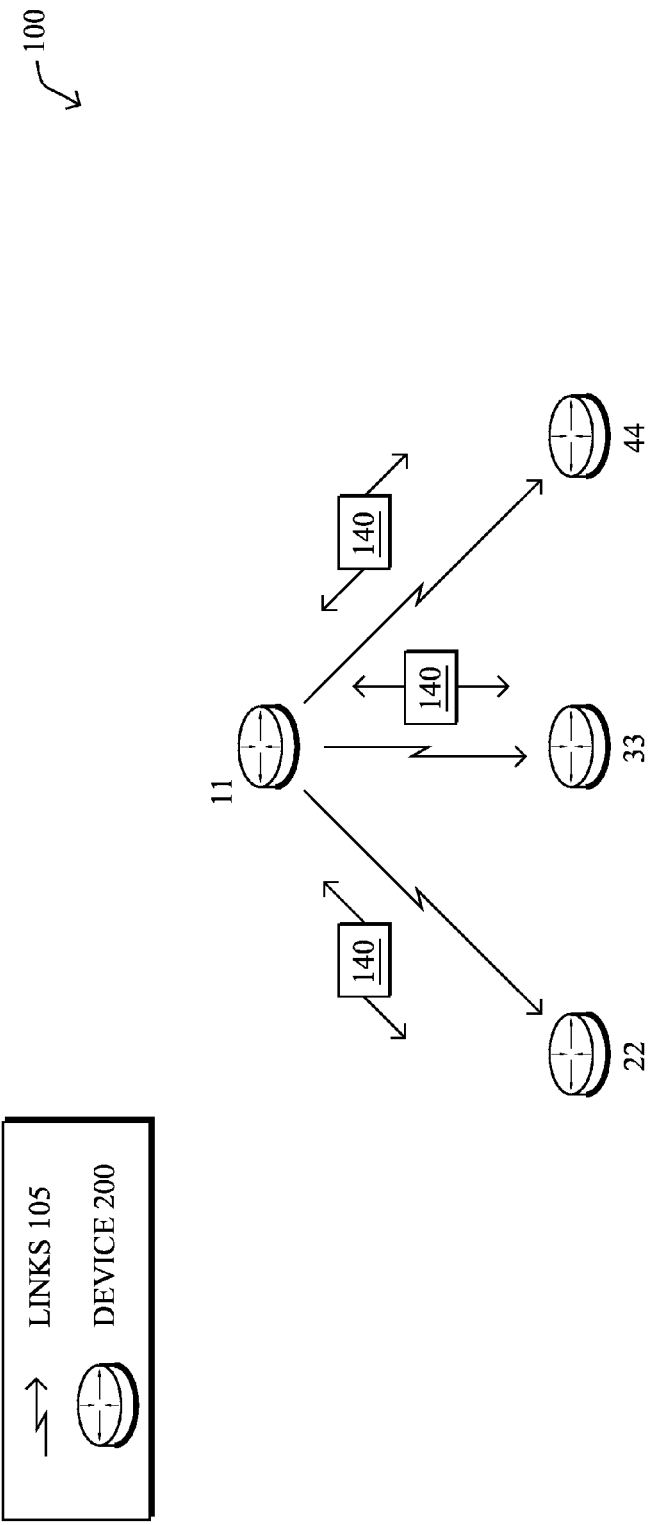
FIG. 1 illustrates an example communication network.

According to one embodiment of the disclosure, a device in a frequency hopping communication network may transmit one or more responsive beacon messages from the device based on an adaptive type of responsive beacon message transmission based on a number of received beacon requests within a given time period, wherein the number being below a threshold results in synchronized unicast responsive beacon message transmission type, and wherein the number being above the threshold results in unsynchronized broadcast responsive beacon message transmission type. In another embodiment, the device suppresses unsolicited beacon message transmission during a given time period based on a density-aware redundancy count of other unsolicited beacon message transmissions from neighboring devices in the communication network during the given time period. In still another embodiment, the device may transmit one or more unsolicited beacon messages according to an adaptive interval of unsolicited beacon message transmission based on stability of the network. In still another embodiment, the device may suppress transmission of a beacon request to join the communication network based on a density-aware redundancy count of other beacon requests from neighboring devices, and to transmit one or more beacon requests at an adaptive interval, wherein the interval increases in response to each unanswered beacon request.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
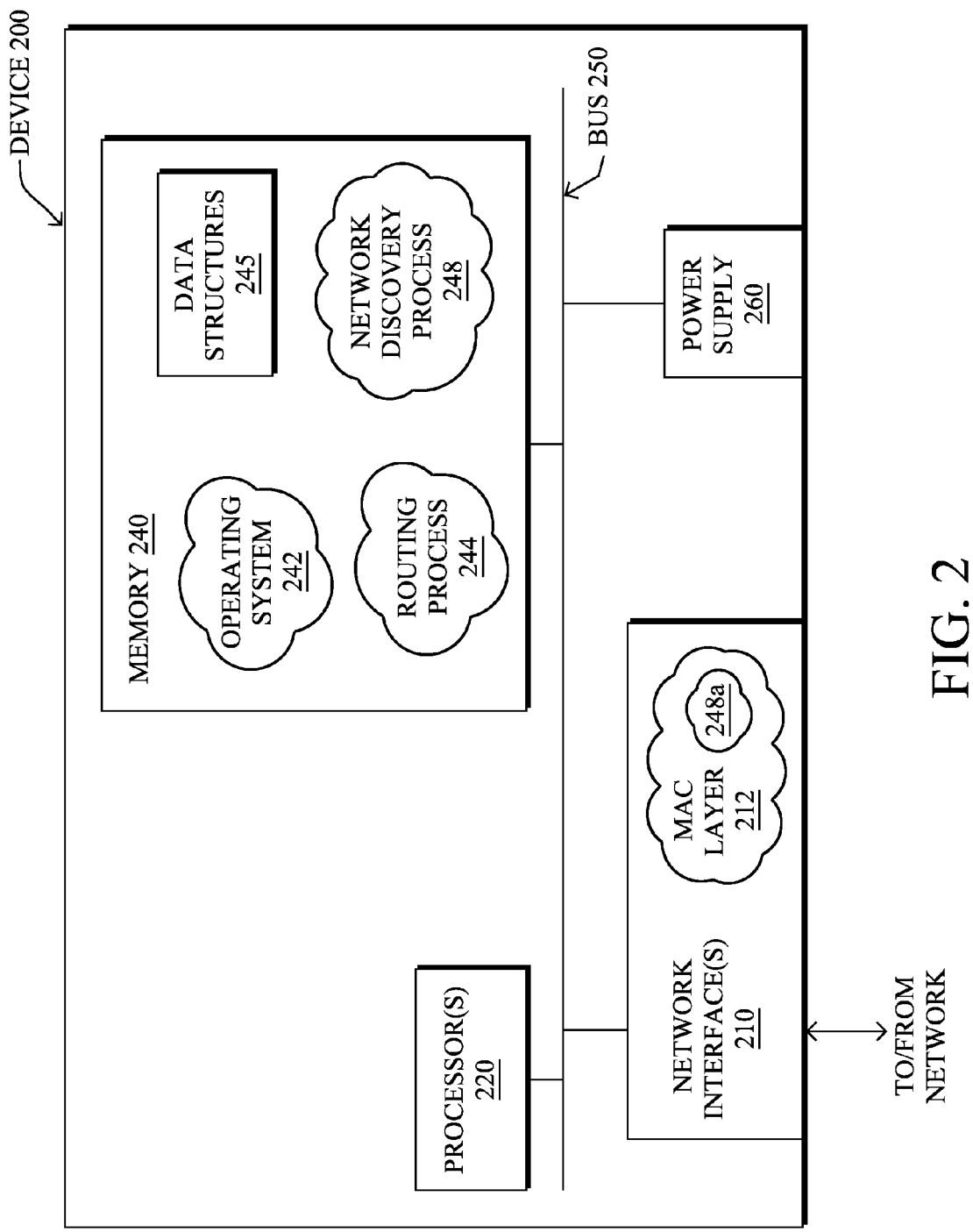
FIG. 2 illustrates an example device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "network discovery" process 248 as described in greater detail below. Note that while network discovery process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 3:
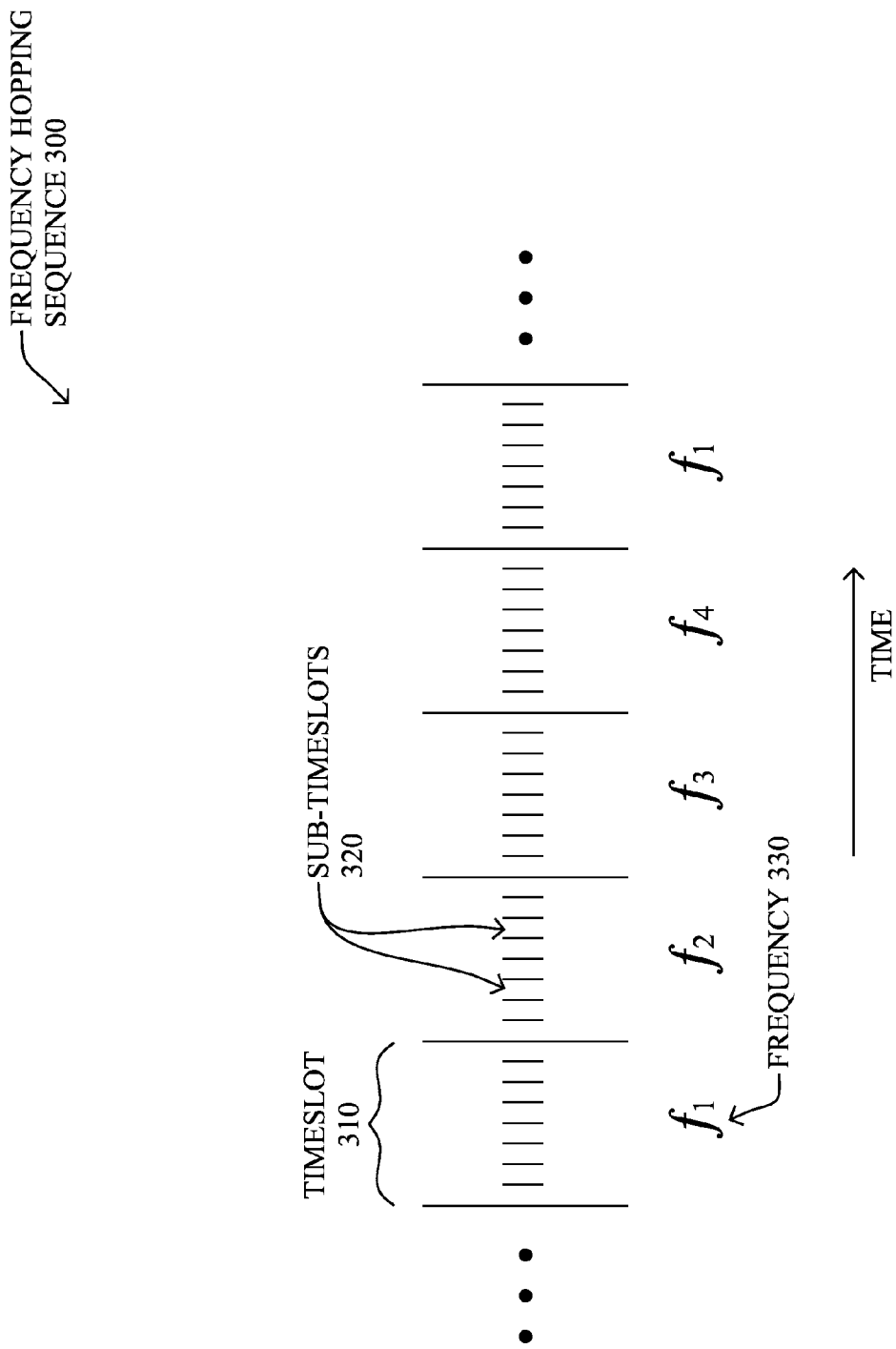
FIG. 3 illustrates an example frequency hopping sequence.

In general, as shown in FIG. 3, in frequency-hopping wireless networks, time frames are divided within a frequency-hopping sequence 300 into regular timeslots 310, each one operating on a different frequency 330 (e.g., $f_{1-f4}$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 310 may be further divided into sub-timeslots 320. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 4A:
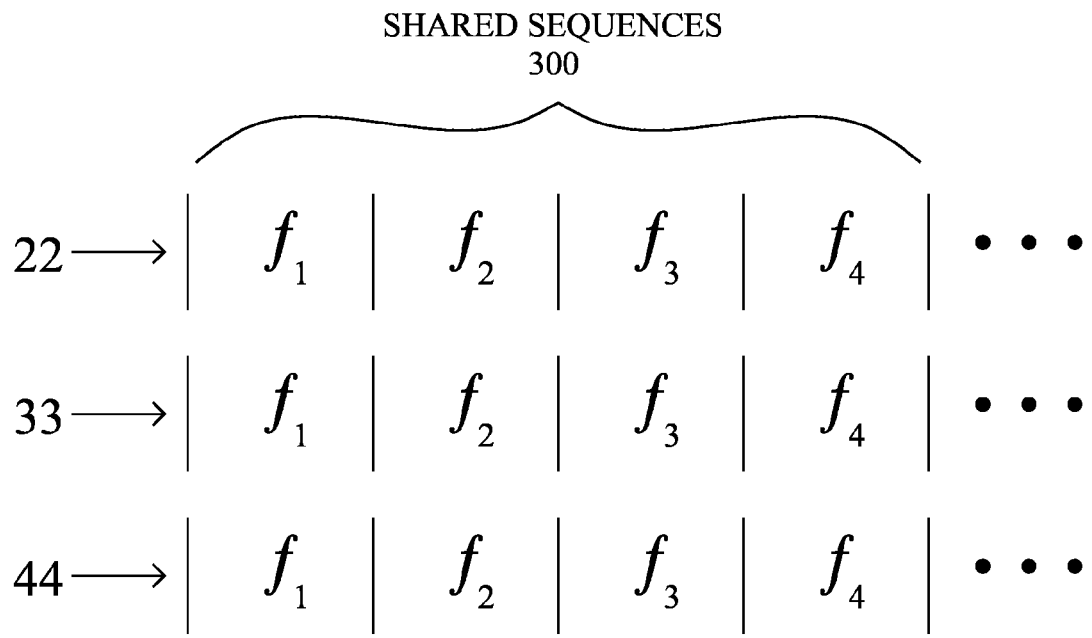
FIGS. 4A-4B illustrate another example of frequency hopping sequences.

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4A, in which each receiver (e.g., 22, 33, and 44) are all configured with the same sequence (assume also that node 11 uses the same sequence).

Figure 4B:
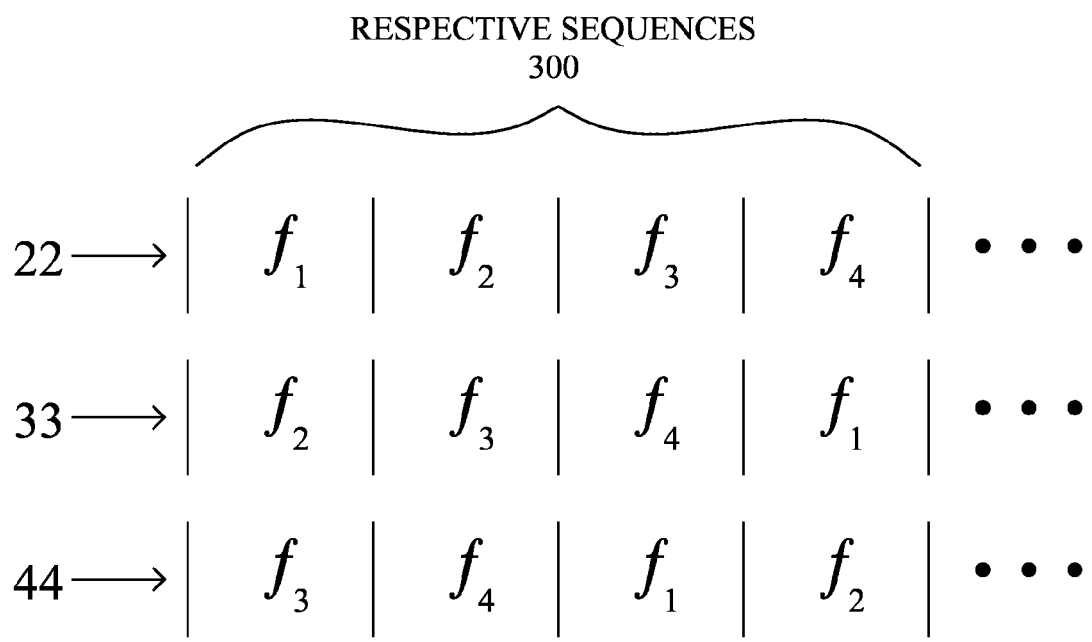

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4B. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Accordingly, an illustrative enhanced example network configuration may be generally premised on the following factors:

1) Having each device determine its own unicast schedule independent of all other devices,
2) Synchronizing the network to a common broadcast schedule that also indicates when devices listen for broadcast transmissions instead of unicast transmissions,
3) Transmitting unicast messages according to the listening schedules determined by the receiver, and
4) Transmitting broadcast messages according to the broadcast schedule.

Operationally, each node maintains its own channel-hopping schedule for receiving unicast messages, thus independently determining a "local unicast listening schedule" for each device. A unicast schedule is defined by the following parameters:

1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.

2) Slot Duration: the unicast schedule divides time into equal sized slots. A node listens to a single channel for the entire duration of a slot. At the beginning of each slot, the node switches to the next channel in the unicast schedule for listening. Note that as mentioned above, each independently determined unicast listening schedule can be independently timed, i.e., the slots (timeslots, sub-timeslots, etc.) need not align between different devices schedules.

Figure 5:
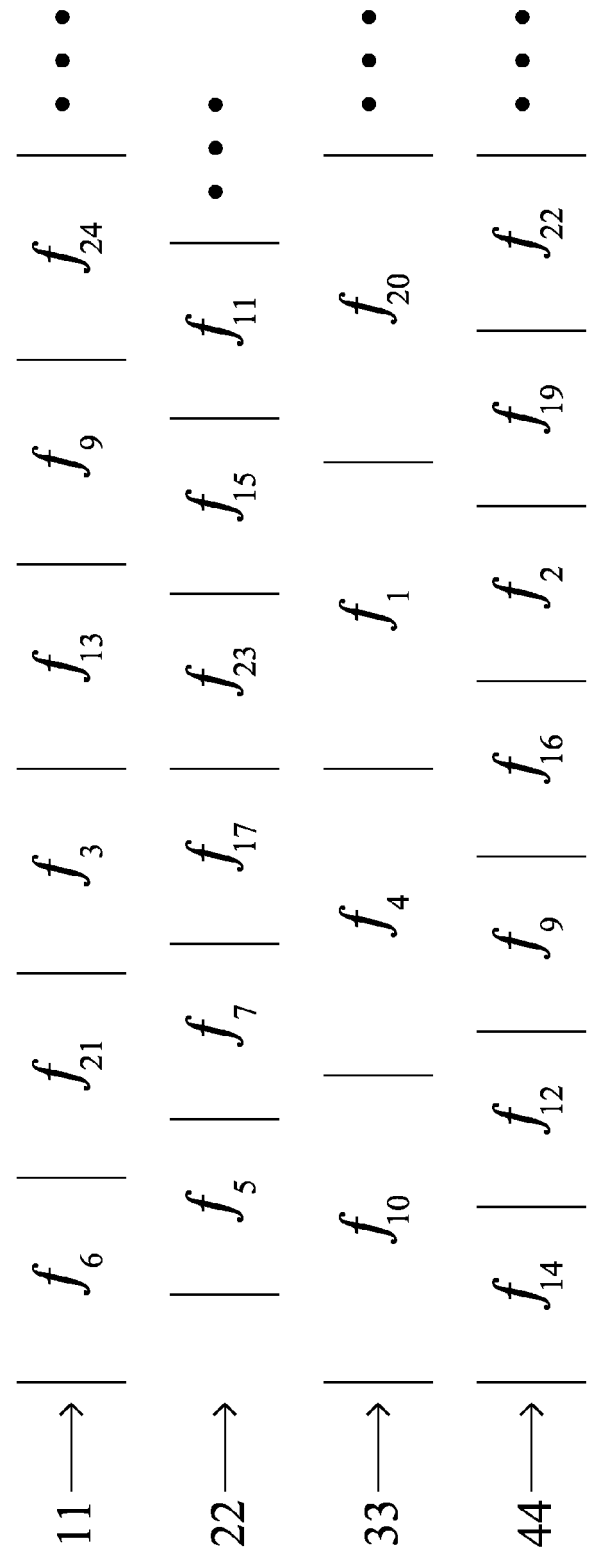
FIG. 5 illustrates example independently determined and independently timed unicast frequency hopping sequences.

FIG. 5 illustrates another example of independently determined local unicast listening schedules 300 that may be computed by each individual device in the network 100. Note how there is generally no overlap at any given time (a goal of the scheduling algorithm, but not a necessity), and that certain frequencies may be re-used at different times. Note also that contrary to FIG. 4B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device may share their local unicast listening schedule with its neighbors, such that each device can correspondingly discovering a neighbor unicast listening schedule for each neighbor, accordingly. As mentioned above, a node includes information about its unicast schedule in various link frames (packets 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

According to the illustrative example, in addition to the unicast listening schedules, all nodes in the same network may synchronize to a common broadcast schedule that simultaneously overlays a configured portion of all unicast listening schedules in the network. Note that there is generally no coordination of broadcast schedules between different networks. A broadcast schedule is defined by the following parameters:

1) Channel Sequence: a list of channels, e.g., indexed by a 16-bit integer, that a mesh interface follows when listening for broadcast transmissions. Each entry in the Channel Sequence may be determined by a function that takes a unique identifier of the network (e.g., an IEEE 802.15.4 personal area network or "PAN" ID) and the list index. Using the network ID helps ensure that neighboring networks (e.g., PANs) do not follow the same pseudo-random sequence and reduces the chance of repeated collisions by neighboring networks.

2) Slot Duration: the broadcast schedule divides time into equal sized slots. At the beginning of each slot, the node switches to the next channel in the broadcast schedule for listening.

Figure 6:
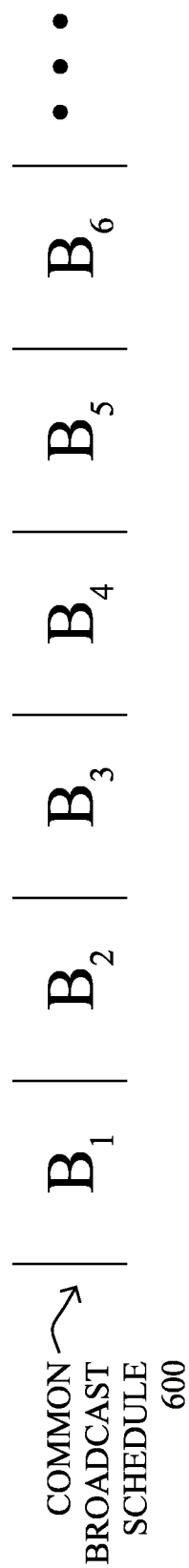
FIG. 6 illustrates an example broadcast frequency hopping sequence.

FIG. 6 illustrates an example broadcast schedule (sequence) 600, showing example frequencies $B_1$-$B_6$. All nodes in the network synchronize to only one broadcast schedule. The slot timing of broadcast slots in the common broadcast schedule may generally be independent of slot timing of unicast slots in the local unicast listening schedule. Note that while the broadcast schedule 600 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., an IEEE 802.15.4 PAN coordinator, Field Area Router, etc.) or automatically discovered (e.g., a smallest IEEE 802.15.4 IEEE EUI-64).

In addition, a broadcast schedule is also defined by the following parameters:

3A) Broadcast Window: specifies how long a node listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

3B) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic.

According to the illustrative example, the common broadcast schedule 600 overlays each individual device's unicast listening schedule 300, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

Figure 8:
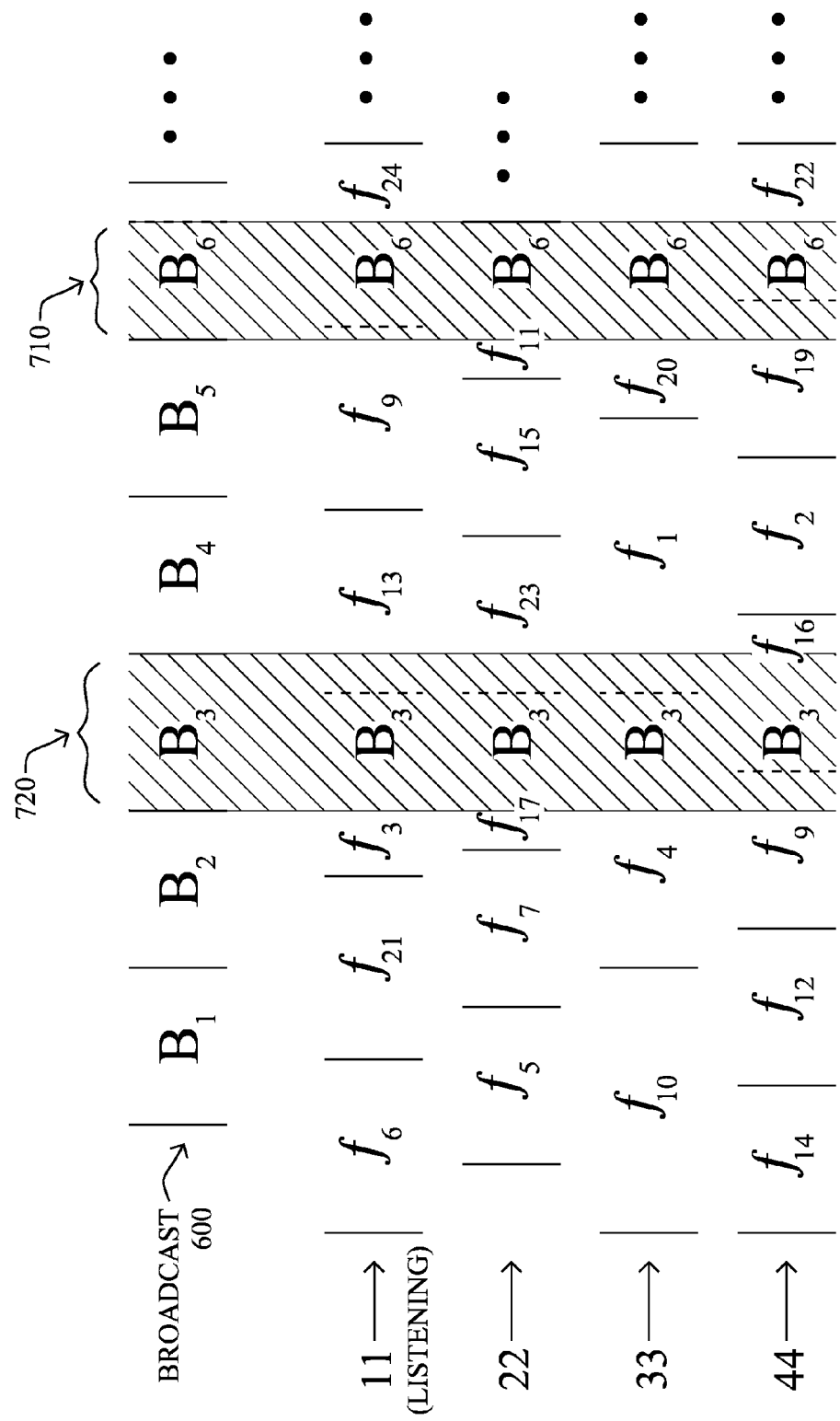
FIG. 8 illustrates an example of the broadcast schedule overlaid on the independent unicast sequences.

For example, FIG. 8 illustrates the overlay of the broadcast schedule 600 over the unicast listening schedules 300 of each device in the network. For instance, as can be seen, node 11 listens to its local unicast listening schedule unless the particular overlaid portion of the broadcast schedule dictates that node 11 listen on the broadcast channel at the time. Should node 11 wish to send a transmission to any of its neighbor nodes (22-44), node 11 uses the neighbor's listening schedule according to whether a unicast message or broadcast message is to be used. Note that in FIG. 8, the left side shows an active broadcast slot period 720, while the right side shows a broadcast window 710, though this is merely for illustration. Note further that a combination of slot period 720 and broadcast window 710 may be used, e.g., defining which particular slots of a broadcast schedule to use (period 720), and then further defining a length of time for each of those slots to use (window 710).

In particular, all unicast link frames are thus sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor.

Also, all broadcast link frames are thus also sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule.

Separating unicast and broadcast traffic is beneficial in cases where broadcast traffic is used for critical network control or application functions. However, the network may optionally be configured to allow transmission of unicast frames during a broadcast slot while the network is actively listening for broadcast transmissions. Doing so reduces communication delays and aggregate capacity for unicast traffic, but comes at the risk of interfering with broadcast traffic.

A synchronized transmission starts within the intended unicast or broadcast slot but does not need to end within the same slot. That is, a link frame transmission only utilizes a single channel and link frames are not fragmented across different channels. Once a node begins receiving a link frame, it will continue receiving the frame until the end of transmission.

Note further that synchronized transmissions should take into account any of the uncertainties in time synchronization. Such uncertainties may be due to frequency tolerances of nodes' clock sources and interrupt processing jitter when time stamping events. To account for these uncertainties, nodes do not begin transmissions near the start or end of a unicast slot or a broadcast listen window. Instead, nodes may schedule their transmissions outside of such guard windows.

Additionally, unicast transmissions typically request an acknowledgment. Acknowledgment frames may thus be sent using the same channel as the received frame being acknowledged. Utilizing the same channel for sending the acknowledgment removes the channel switch overhead on both the transmitter and receiver. Because acknowledgment frames are transmitted without a clear-channel assessment, the acknowledgment transmission may continue to use the same channel originally acquired by the frame being acknowledged.

Optimized Network Discovery

As mentioned above, a network discovery system generally requires two functions. First, a discovery protocol is needed between a device within a network and a device attempting to join the network that allows joining devices to passively listen or actively probe for neighboring networks. To support passive listening, devices in a network transmit beacons periodically to announce the presence of a network, while to support active probing, joining devices transmit messages to devices within the network to request a beacon transmission. Second, a network discovery system generally requires a dissemination protocol to communicate network-wide parameters used for the network join process to all devices in the network, such as a network name (similar to an IEEE 802.11 SSID), access-control security parameters, and/or an indication of network size to allow load balancing across networks.

In general, discovery protocols cannot utilize synchronized transmissions since the devices are not synchronized to the frequency hopping schedule of the network or any individual device within the network. Instead, the devices are forced to utilize more expensive unsynchronized transmissions. Also, having every node transmit network discovery beacons with a fixed period is problematic in dense environments since the channel utilization is proportional to network density. In addition, having all nodes that receive a beacon request respond to the request with a transmitted beacon results again in the channel utilization generated by the response being proportional to network density.

The techniques described herein, therefore, minimize the use of unsynchronized transmissions used during the network discovery process, and provide a number of beacon transmissions that remains generally stable independent of the network density. In particular, the description herein introduces the concept an efficient network join process that is density aware, through the use of a variety of mechanisms. For instance, the techniques may use an adaptive beacon transmission period to quickly propagate new information and respond to beacon requests while reducing overhead in the steady state, as well as a suppression mechanism to eliminate wasteful beacon and beacon request transmissions that would otherwise occur when using a fixed period. Also, nodes may switch between synchronized unicast and unsynchronized broadcast when responding to beacon request messages. In addition, the techniques herein may utilize the same beacon messages to provide network-wide parameters to joining devices and other devices within the network to include in their own beacon messages.

Illustratively, the techniques described herein may be performed by hardware, software, and/or firmware, such as in accordance with network discovery process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the IEEE 802.11 protocol, IEEE 802.15.4, WiFi, etc., and as such, would be processed by similar components understood in the art that execute such protocols, accordingly.

Operationally, the network discovery/joining system described herein uses two messages:
1) Beacon messages to announce the presence of a network to joining devices and disseminate network-wide parameters required by joining devices to all nodes in the network; and
2) Beacon request messages used by a joining device to request beacon transmissions from neighboring devices.

Figure 9A:
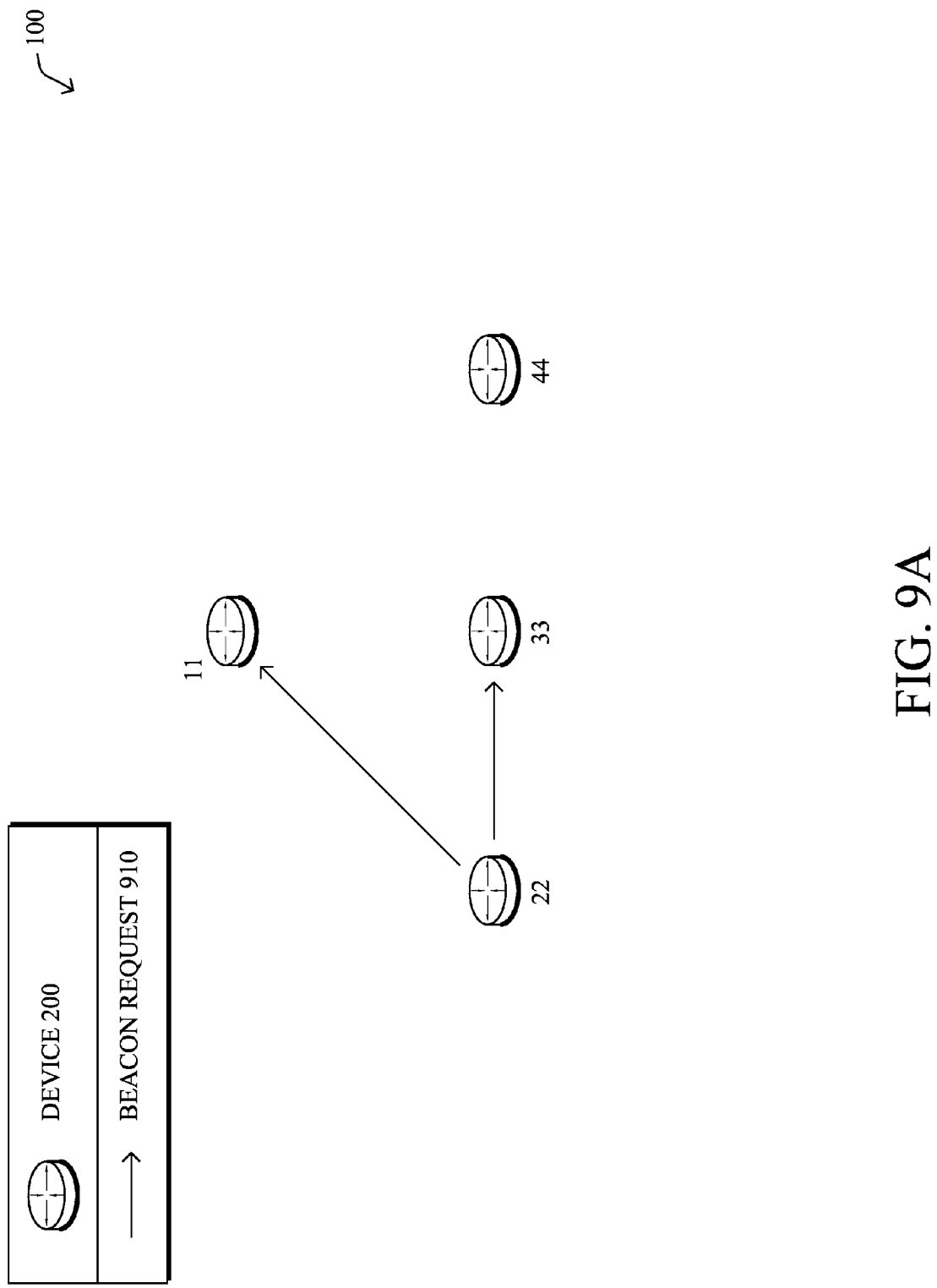
FIGS. 9A-9B illustrate an example of network discovery message transmission.
Figure 9B:
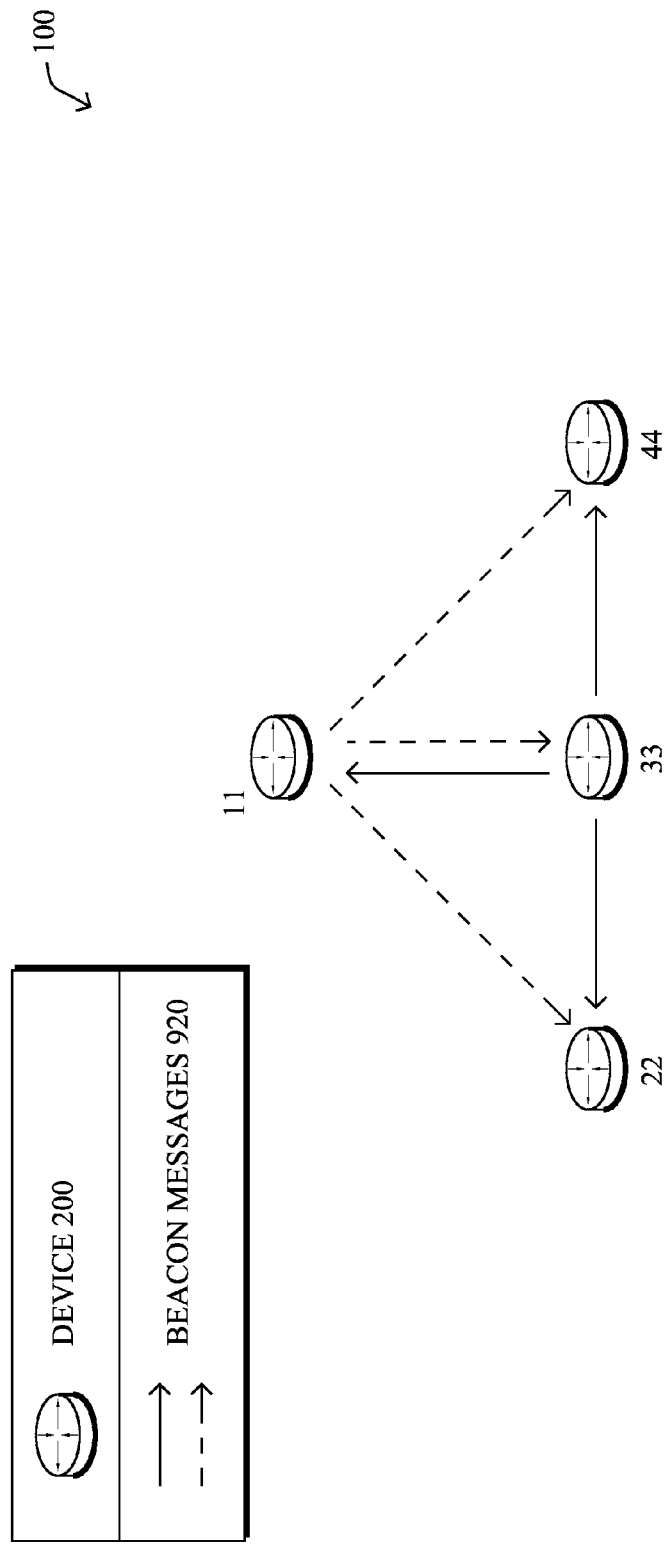

FIGS. 9A-9B illustrate an example of network discovery message transmission. In the simplified view in FIG. 9A, for instance, node 22 may desire to join the network 100, and as such transmits a beacon request message 910 into the network, such as through broadcasting the message or transmitting the message on a plurality of channels, in order to determine whether any other nearby neighbor device is able to hear the request and respond with a beacon message. Accordingly, as shown in FIG. 9B, assuming that nodes 11 and 33 heard the beacon request message 910 from node 22 (and assuming that they are configured to respond), each node may return a beacon message 920 to node 22.

Note that where the beacon message is a unicast message to node 22, surrounding neighbors may not receive the transmitted beacon messages if they are on different channels at the time (e.g., node 33 and 44 also hear node 11's beacon transmission only if receiving on the same channel, e.g., a broadcast channel).

As such, FIG. 9B also illustrates the transmission of beacon messages 920 to disseminate in-network information to devices having already joined the network. In particular, for network-wide parameter dissemination, devices in the network occasionally transmit beacon messages 920 to propagate network-wide parameters. All devices in the network synchronize to the latest version of the information indicated by a network information version (described below). Even with link-layer security mechanisms, beacon messages are generally always sent in the clear so that joining devices can utilize the information in the joining process. However, beacon messages carry a signature signed by a key known only to devices in the network so that the information can be authenticated. Devices only rebroadcast network information in their own beacon transmissions after they have verified the signature.

Figure 10:
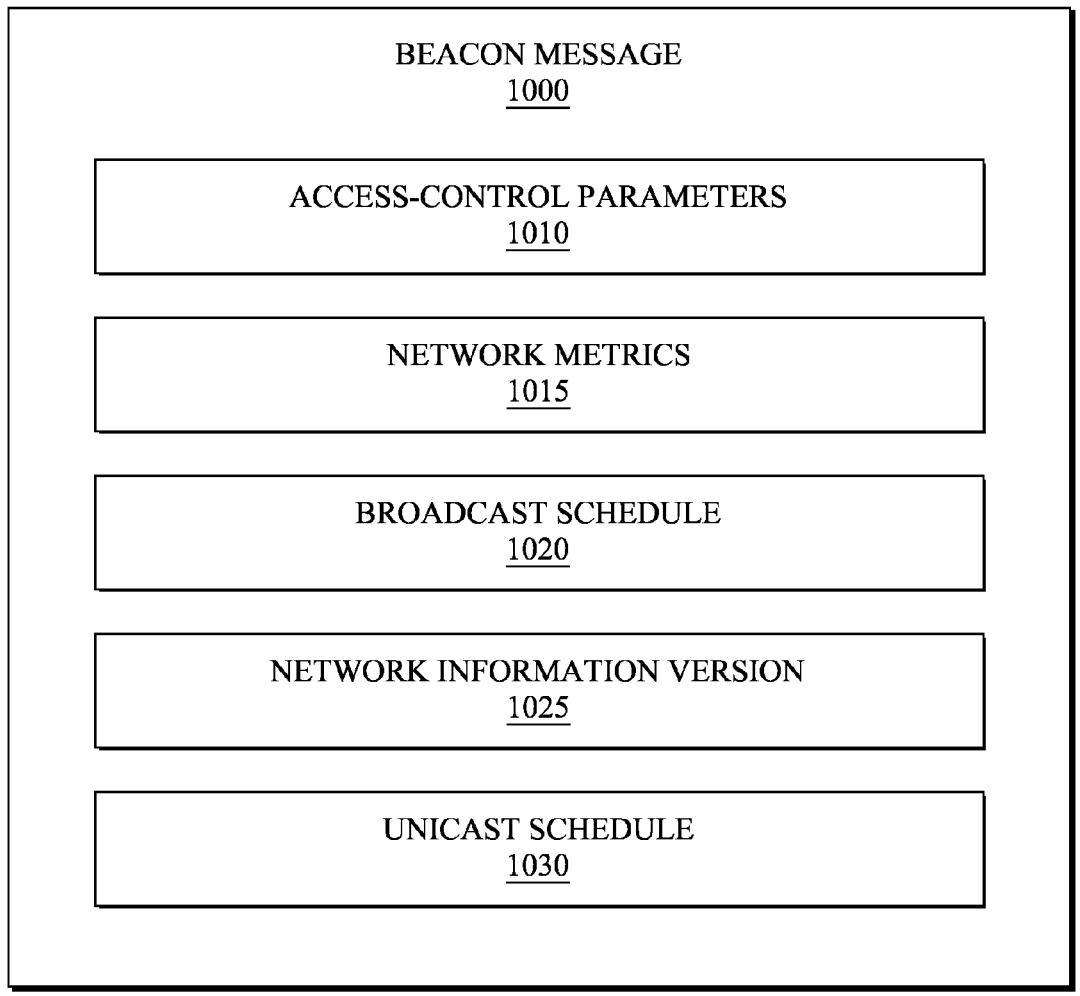
FIG. 10 illustrates an example network discovery message.

FIG. 10 illustrates a format 1000 of an example network discovery message (beacon message 920) that may be utilized by the embodiments herein to provide both network-wide parameters to joining devices and to neighbor devices already within the network. Specifically, devices within a frequency hopping network occasionally transmit a beacon message to announce their presence and the presence of the network. Beacon messages are also used to disseminate network-wide information required to support the network join process. The beacon contains information about the network that a joining node requires in its process of searching for and joining a network. Such information may include the following fields (in no particular order):

1005) Network Name: illustratively similar to an 802.11 SSID;
1010) Access-Control Parameters: illustratively similar to those used by a secure authentication and access-control protocol such 802.11i and 802.1x;
1015) Network Metrics: to assist the joining node in choosing the best network among two or more neighboring networks to join (e.g., the number of nodes already participating in the network, traffic levels, etc.);
1020) Broadcast Schedule: to allow neighboring nodes to synchronize with the network's broadcast schedule;
1025) Network Information Version: a version number set by the network coordinator (typically a Field Area Router) that provides a total ordering on updates to the information provided in the previous fields; and
1030) Unicast Schedule: to allow neighboring nodes to synchronize with the individual device's unicast schedule.

At the core of the techniques herein is how a device decides to transmit beacons 920 and beacon requests 910. First, regarding beacon transmission, according to one or more embodiments herein, each device already in the network uses the following algorithm to determine when and how it should transmit a beacon message. A beacon transmission timer runs for a defined interval and may have the following illustrative configuration parameters:

1) The minimal interval size, Imin;
2) The maximum interval size, Imax;
3) A redundancy constant k; and
4) A request constant R.

In addition to the configuration parameters, the beacon transmission algorithm may illustratively maintain the following variables:

1) The current interval size, I;
2) A transmission time within the current interval, t;
3) A redundancy counter, c; and
4) A request counter, r.

An illustrative beacon transmission algorithm is now described with reference to FIGS. 11A-11D, which illustrate an example simplified procedure 1100 for efficient network discovery in a frequency hopping communication network in accordance with one or more embodiments described herein, e.g., from the perspective of a device already within the network.

Figure 11A:
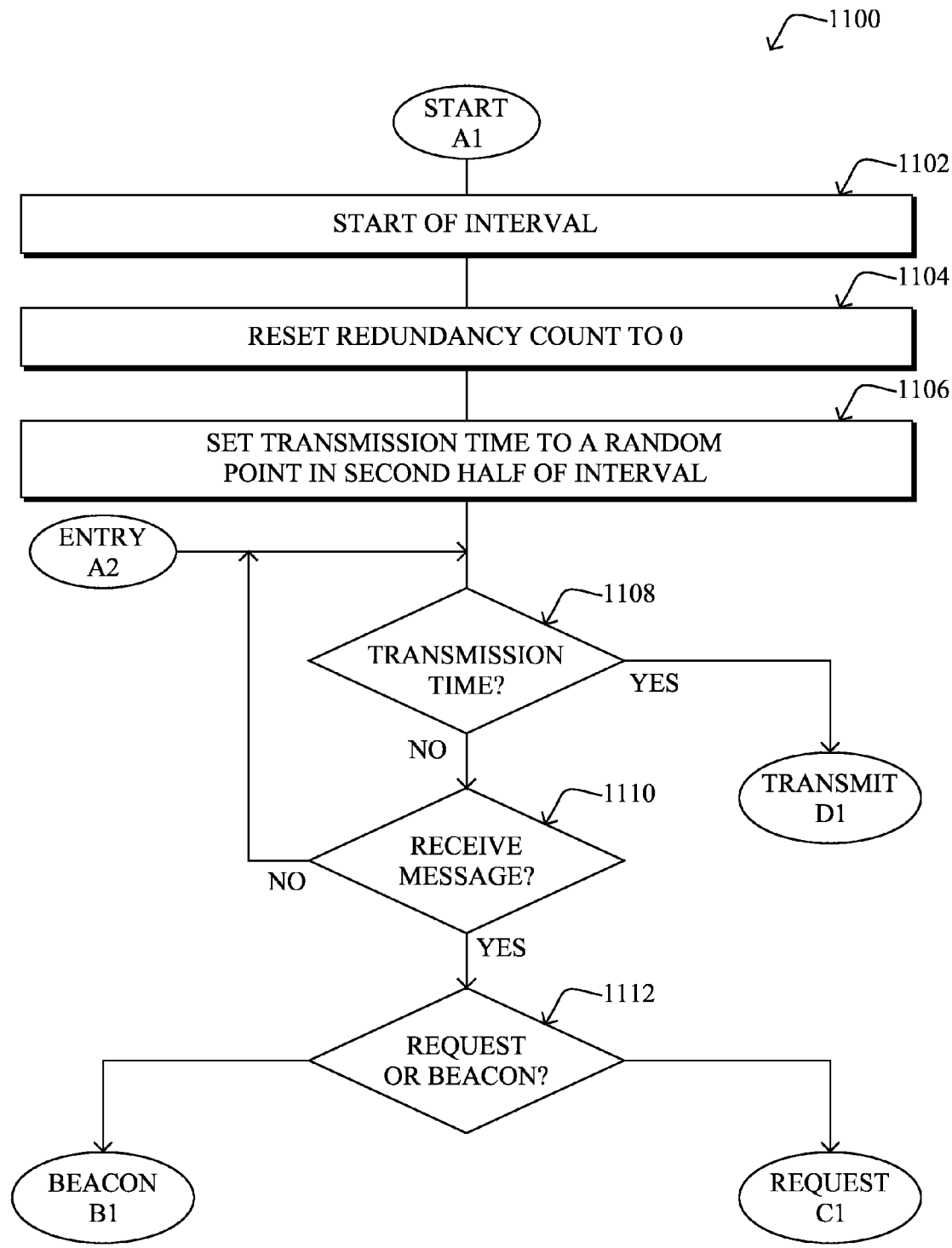
FIGS. 11A-11D illustrate an example simplified procedure 1100 for efficient network discovery in a frequency hopping communication network in accordance with one or more embodiments described herein, e.g., from the perspective of a device already within the network.

Starting in FIG. 11A, when an interval begins at step 1102, the redundancy count c is reset to 0 in step 1104, and the transmission time t is set in step 1106 to a random point in the second half of the interval (i.e., greater than or equal to I/2 and less than I), where the interval ends at I. Assuming that the transmission time t has not been reached in step 1108, then in step 1110 a message may be received at the device, selected in step 1112 from a request 920 (proceeding to "C1") or another device's beacon 910 (proceeding to "B1").

Figure 11B:
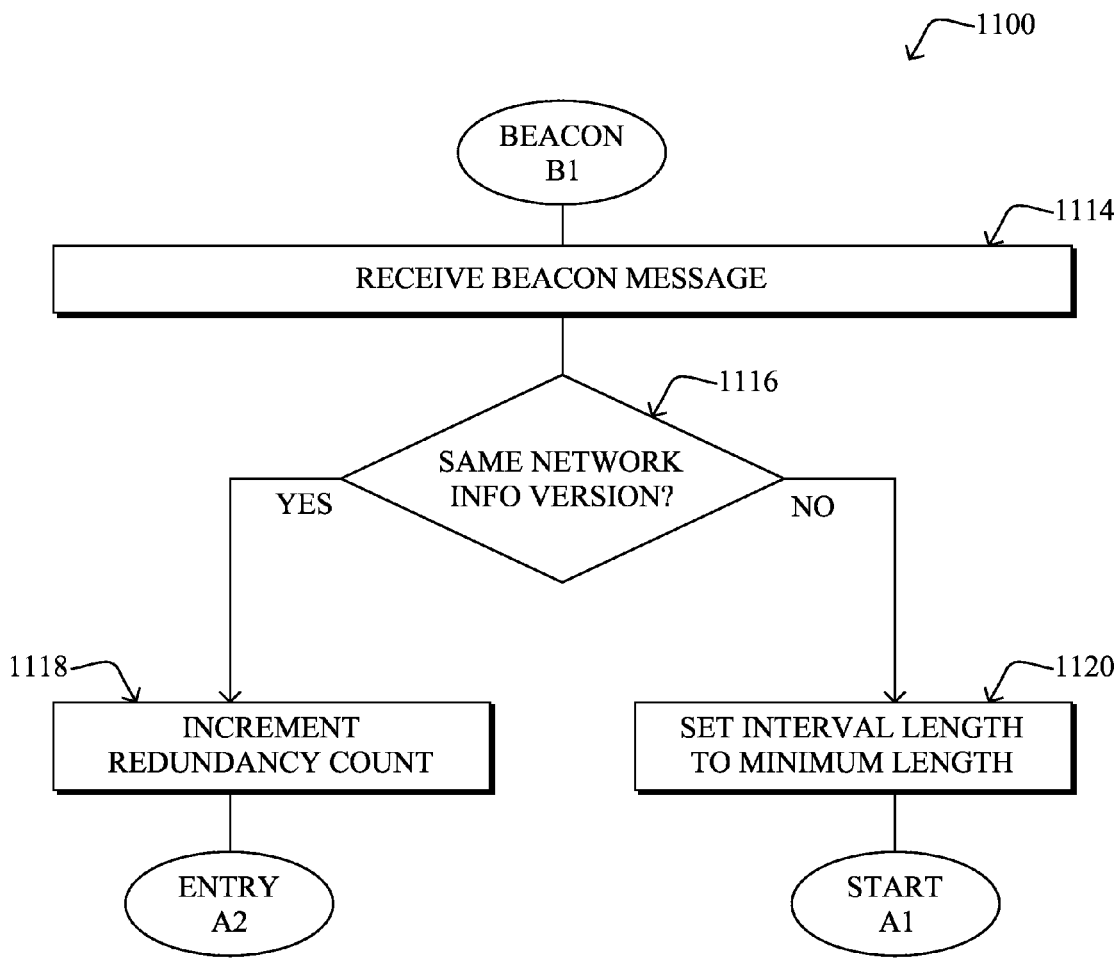

As shown in FIG. 11B, when receiving an unsolicited beacon message in step 1114 from a neighboring node in the same network, it may be determined in step 1116 whether that message contains the same network information version 1025 as the pending beacon transmission (i.e., for the device executing the algorithm). If it is the same version, then in step 1118, the redundancy count c is incremented, and the procedure 1100 returns to "entry A2" of FIG. 11A to continue until the transmission time t. Note that in response to receiving a beacon message from a neighboring node in the same network that contains a different network information version as the pending beacon transmission, and where I is not already set to Imin, in step 1120 the interval length I may be set to the minimum length Imin, and a new interval is started by returning to "start A1" in FIG. 11A.

Figure 11C:
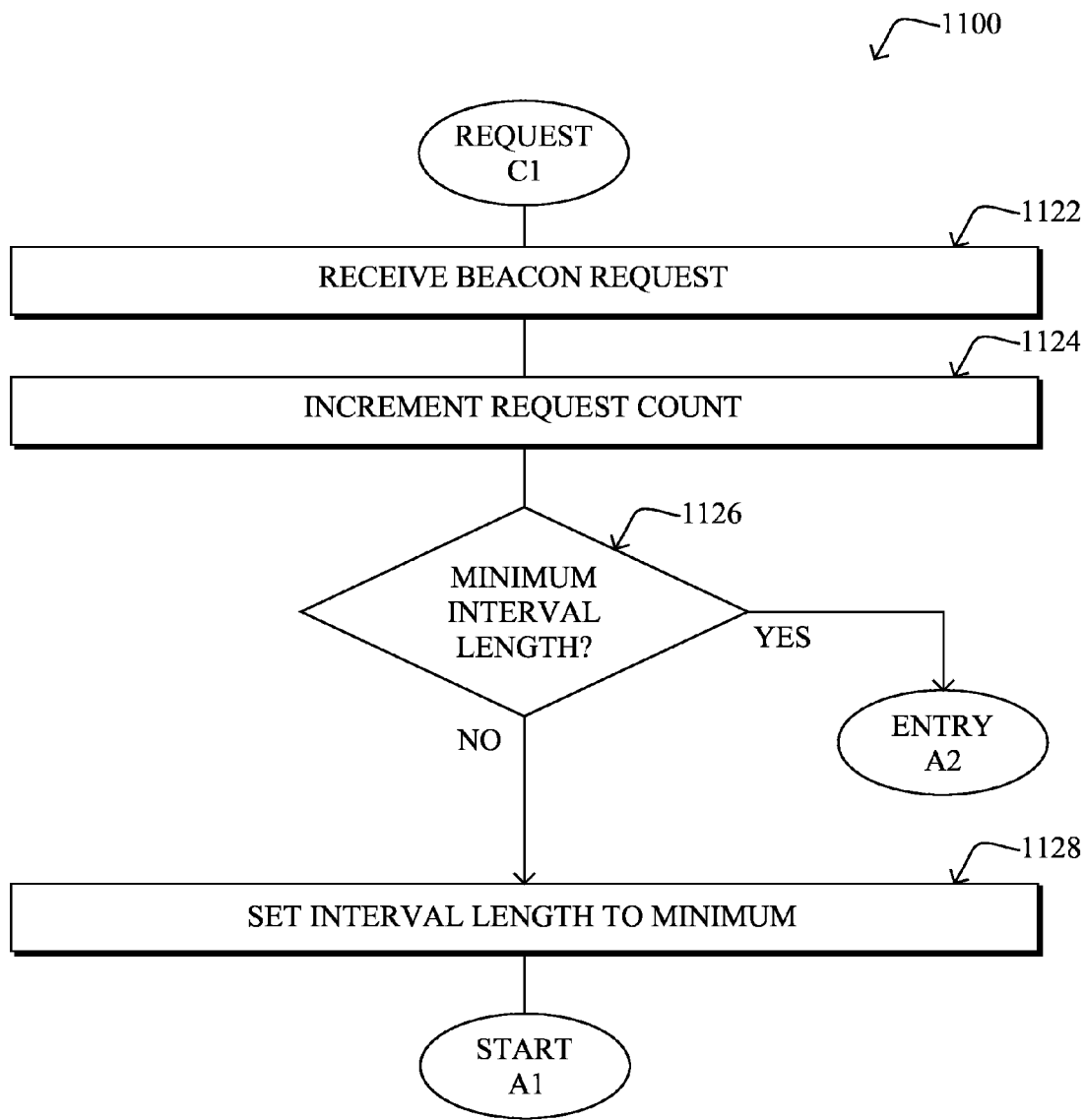

Turning to FIG. 11C, for beacon request messages ("C1"), upon receiving a beacon request message 910 from a neighboring node in step 1122, the request count r is incremented in step 1124. Also, if I is not already set to Imin, i.e., if in step 1126 the interval length is not the minimum interval length, then, set in step 1128 the interval length I is set to the minimum Imin, and the algorithm starts a new interval at "start A1."Otherwise, if the interval length has already been set to the minimum Imin, then the procedure returns to FIG. 11A at "entry A2."

Figure 11D:
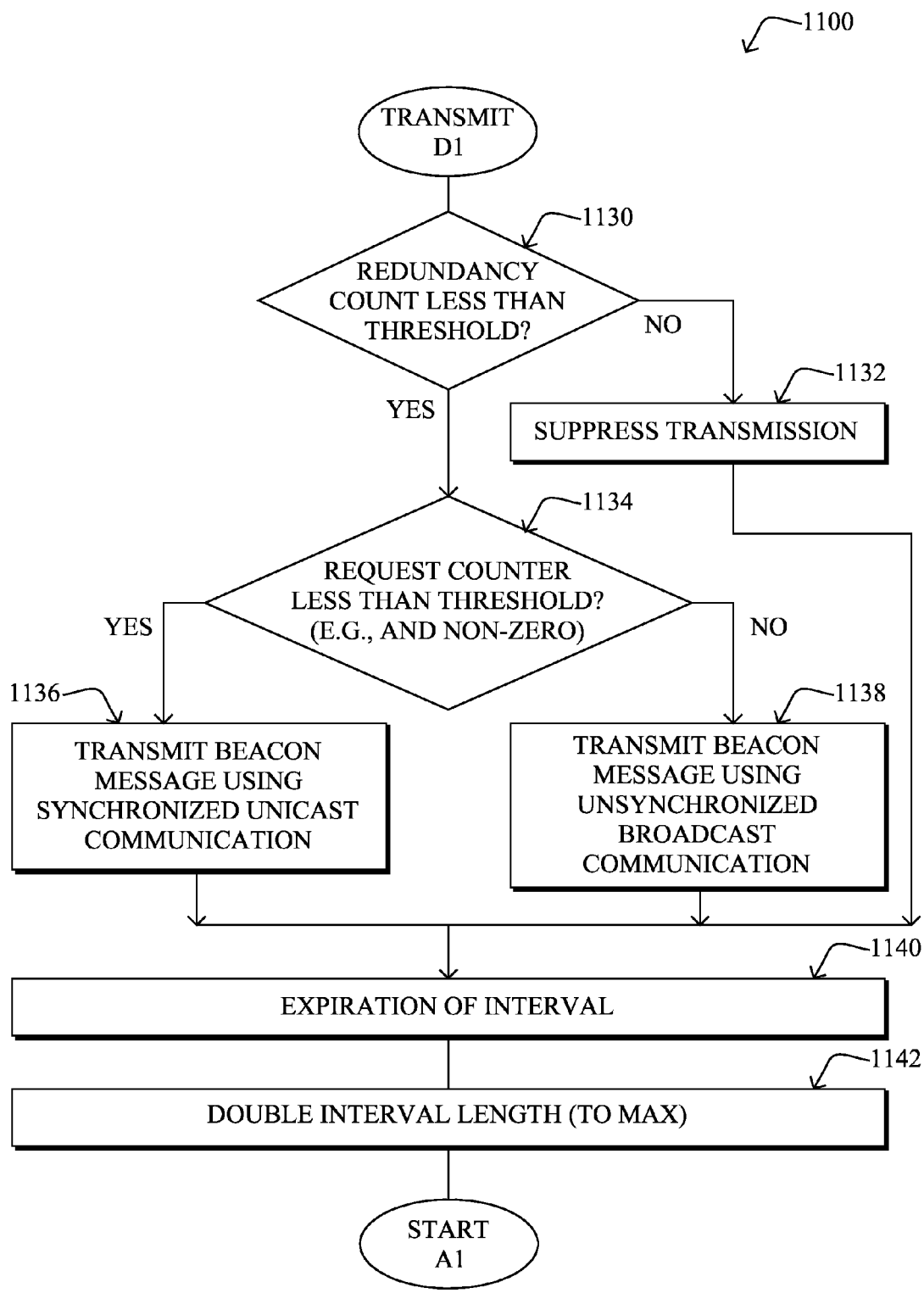

At transmit time t, transitioning from step 1108 in FIG. 11A to "transmit D1" in FIG. 11D, a beacon message is transmitted if and only if the redundancy counter c is less than the redundancy constant k, that is, if in step 1130 the redundancy count is less than the threshold. Otherwise, if the density-aware suppression encounters a high redundancy count, then in step 1132 the transmission at time t is suppressed, accordingly.

When transmitting a beacon message, step 1134 may first determine whether the request counter r is non-zero and less than the request constant R (a threshold). If so, then the beacon message may be transmitted using synchronized unicast communication in step 1136. Otherwise, if there have been a lot of requests r, then in step 1138 the device may transmit using unsynchronized broadcast communication. In step 1140 when the interval I expires, the interval length may be increased (e.g., doubled) in step 1142 (up to Imax). That is, if the new increased/doubled interval length is greater than Imax, the device sets the interval length to Imax. The procedure 1100 then returns to "start A1" of FIG. 11A for a new interval.

Note that the beacon transmission algorithm is density-aware. Intuitively, any given radio range only requires a low rate of beacon transmissions regardless of the node density to announce a network's presence and disseminate network-wide parameters to all devices in the network. By keeping a redundancy count and suppressing transmissions when the redundancy count exceeds a threshold eliminates wasteful transmissions that would otherwise occur if all nodes transmit using a fixed period.

Figure 12:
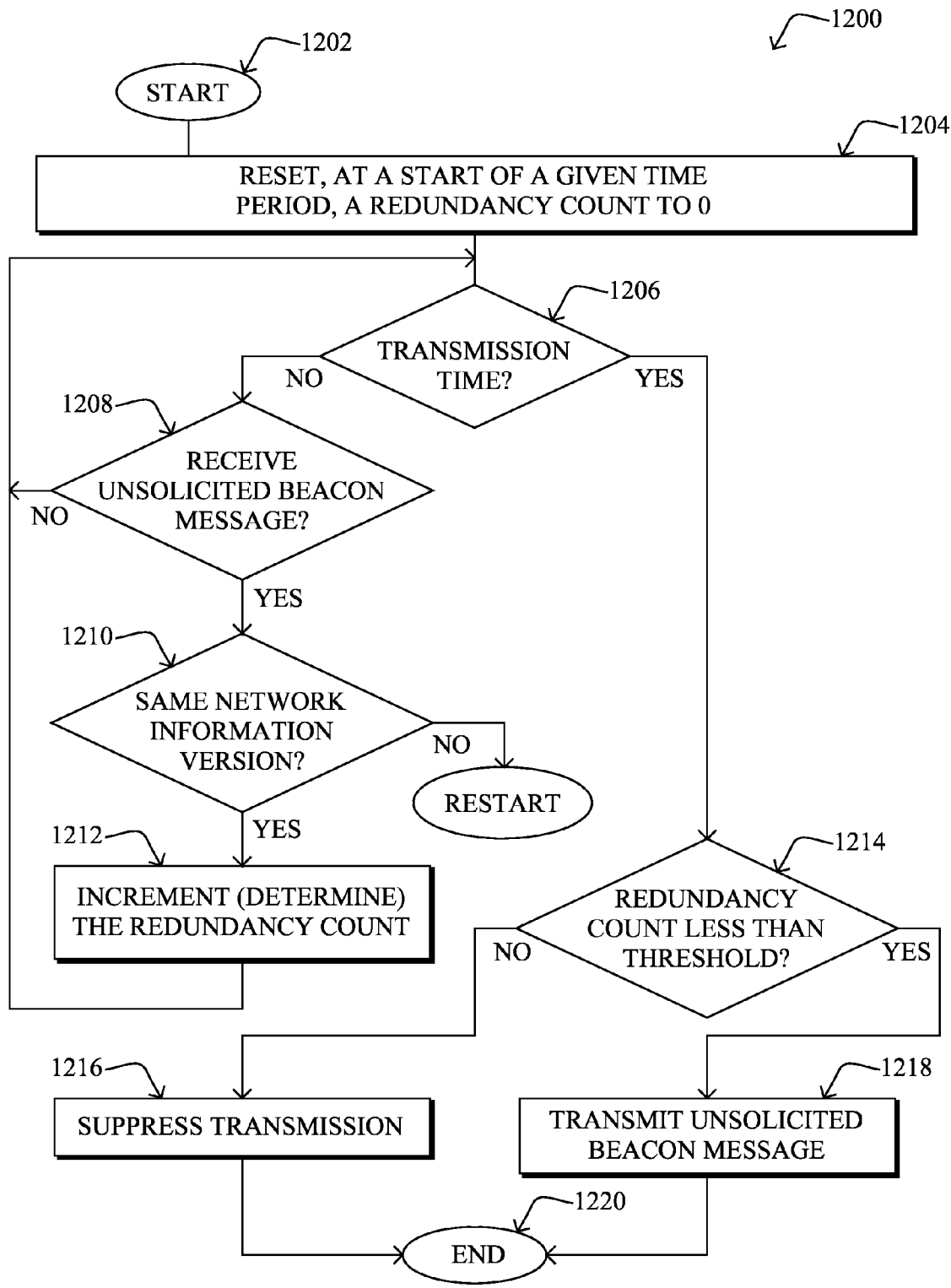
FIG. 12 illustrates an example simplified procedure 1200 for efficient network discovery in a frequency hopping communication network in accordance with one or more embodiments described herein, e.g., for the particular example of density-aware suppression.

FIG. 12 illustrates an example simplified procedure 1200 for efficient network discovery in a frequency hopping communication network in accordance with one or more embodiments described herein, e.g., for the particular example of density-aware suppression. (In particular, FIGS. 12-14 illustrate specific components of operation described with reference to FIGS. 11A-11D above.) The procedure 1200 starts at step 1202, and continues to step 1204 to reset, at a start of a given time period, a redundancy count to 0. If it is not yet transmission time in step 1206, then the device proceeds to determine a density-aware redundancy count of other unsolicited beacon message transmissions from neighboring devices in the communication network during the given time period. For instance, if in step 1208 an unsolicited beacon message is received by the device, and if it has the same network information version in step 1210, then in step 1212, the redundancy count is incremented (determined), accordingly. Once ready to transmit in step 1206, then in step 1214 the device first determines whether the redundancy count is less than the threshold, and suppresses unsolicited beacon message transmission in step 1216, i.e., based on the density-aware redundancy count of other unsolicited beacon message transmissions from neighboring devices in the communication network during the given time period. Only if the density-aware redundancy count is below the threshold in step 1214 would the device transmit an unsolicited beacon message in step 1218. The procedure 1200 ends in step 1220.

Note also that the adaptive interval driven by the techniques herein allows quick responses to beacon requests and quick propagation of network-wide information when it changes, while reducing channel utilization in the steady state. That is, quickly propagating network-wide parameters is not only useful to reduce communication latency, but also reduces time-synchronization errors caused by clock drift in synchronizing with the network-wide broadcast schedule. Since devices typically only synchronize to the broadcast schedule on a change in the network information version value, reducing the transmission period reduces the amount of drift that can occur between receiving the broadcast schedule and transmitting it to the next-hop devices.

Figure 13A:
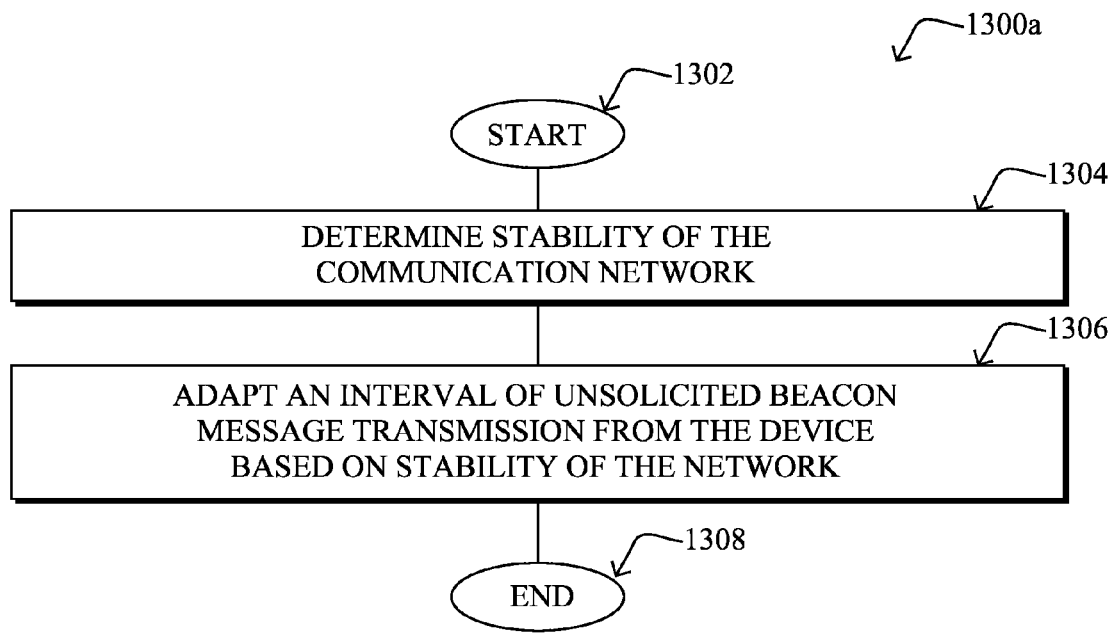
FIGS. 13A-13B illustrate an example simplified procedures 1300a and 1300b for efficient network discovery in a frequency hopping communication network in accordance with one or more embodiments described herein, e.g., for the particular example of adaptive intervals.
Figure 13B:
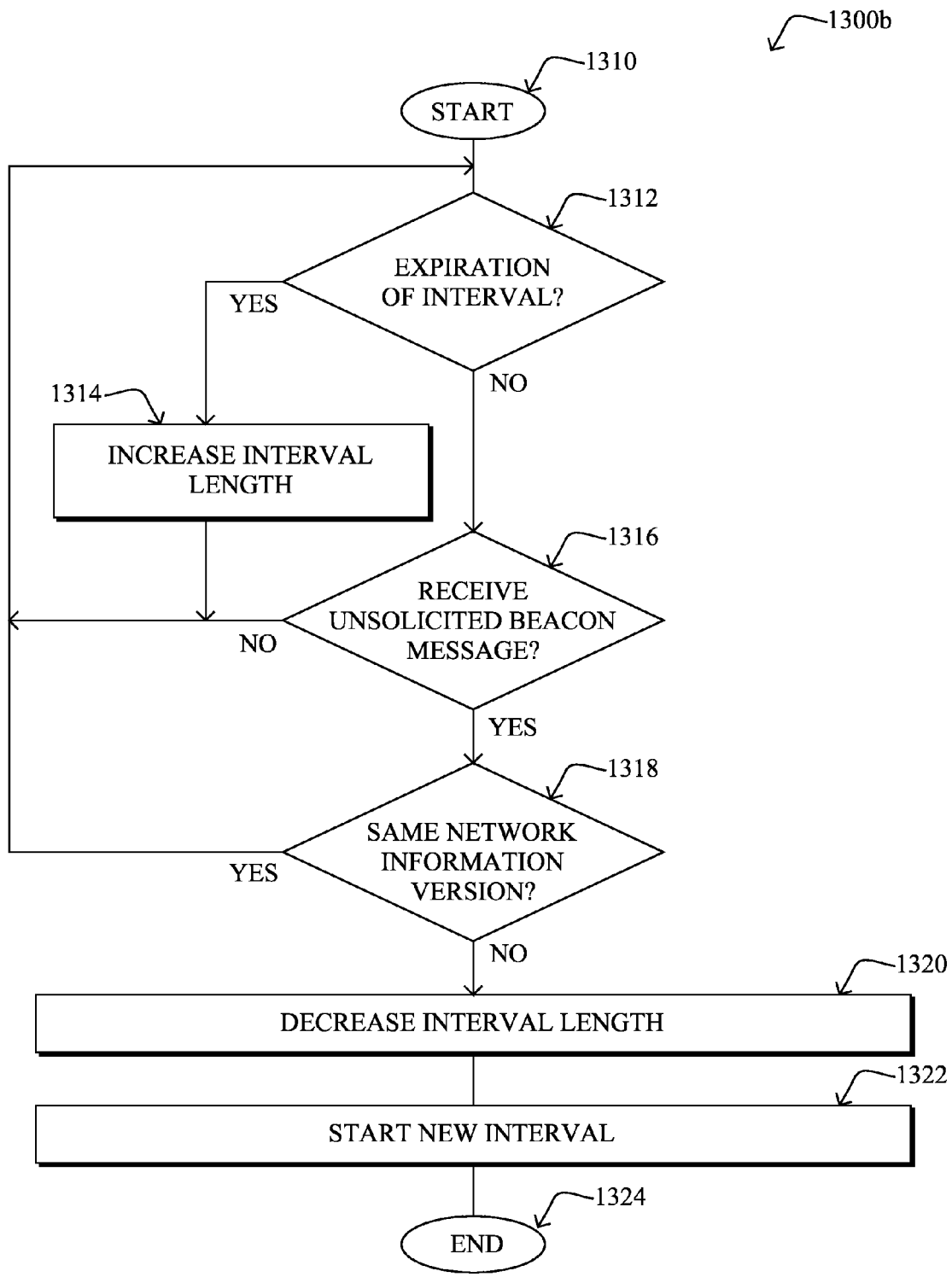
Figure 14:
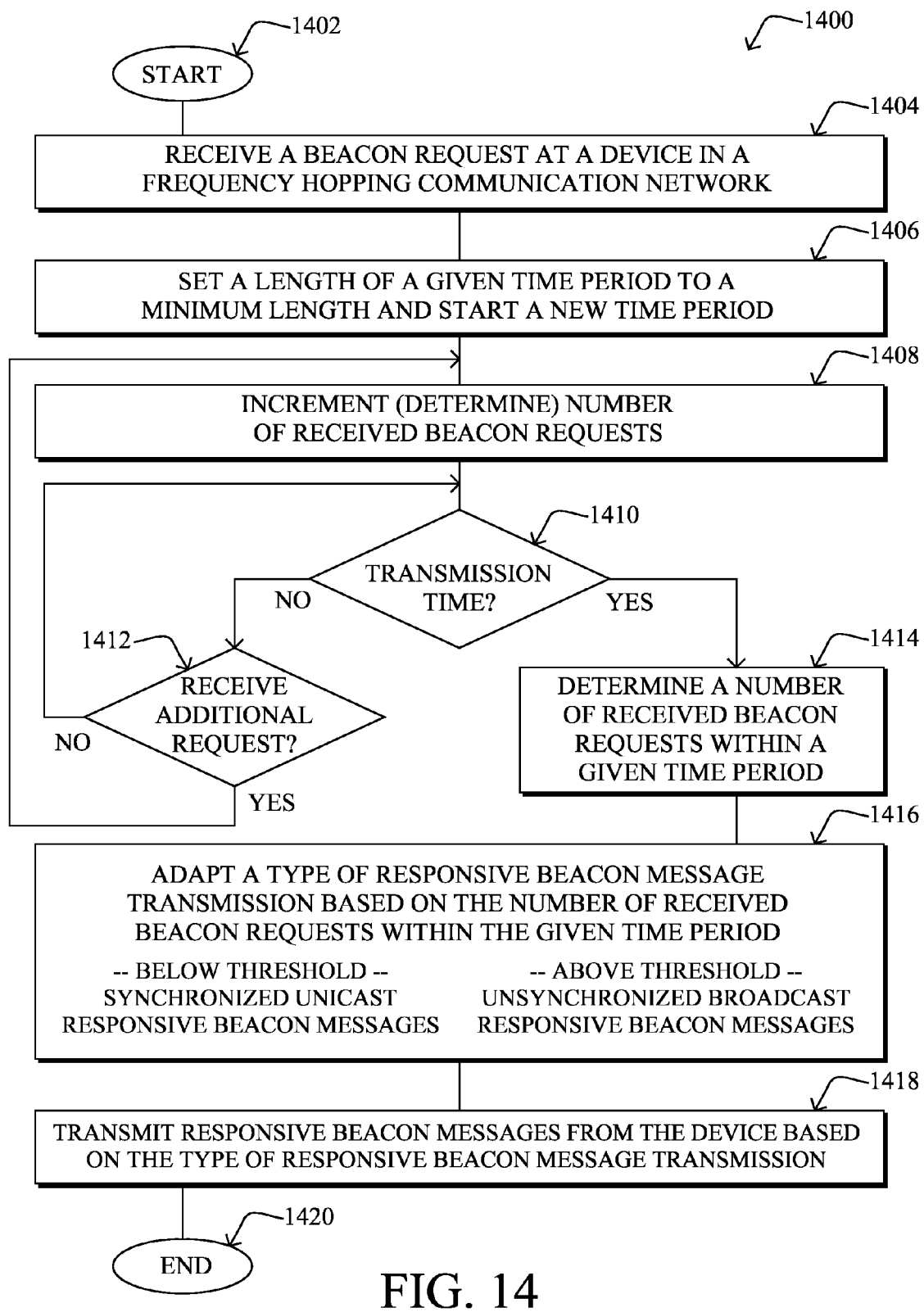
FIG. 14 illustrates an example simplified procedure 1400 for efficient network discovery in a frequency hopping communication network in accordance with one or more embodiments described herein, e.g., for the particular example of selecting a transmission type.

Correspondingly, FIGS. 13A-13B illustrate an example simplified procedures 1300a and 1300b, respectively, for efficient network discovery in a frequency hopping communication network in accordance with one or more embodiments described herein, e.g., for the particular example of adaptive intervals. For instance, procedure 1300a starts in step 1302, and continues to step 1304 to determine the stability (e.g., consistency) of the communication network. Accordingly, in step 1306, the device may adapt the interval of unsolicited beacon message transmission based on the stability, and the simplified procedure ends in step 1308. As an alternative illustration, procedure 1300b starts in step 1310, and upon expiration of the interval in step 1312, the device continually increases the associated interval length in step 1314, until reaching a maximum value. On the other hand, if in step 1312 the interval has not yet expired, and in step 1316 an unsolicited beacon message is received, then the device determines in step 1318 whether the message has the same network information version as the pending beacon message of the device. If they are different versions, i.e., an updated version, then in step 1320 the interval length is decreased, thus indicative of instability and/or inconsistency, and thus a need to update more often. A new interval starts in step 1322, and the procedure 1300b illustratively ends in step 1324.

Note further that the techniques herein provide an efficient mechanism for responding to beacon request messages. In particular, a device may respond to beacon request messages using either synchronized unicast or unsynchronized broadcast communication. For instance, when one or a small number of devices are transmitting beacon requests, it may be more efficient to transmit synchronized unicast messages and utilize the independent channel-hopping schedules. When enough beacon request messages are received, it is more efficient to use unsynchronized broadcast communication to reach all nodes simultaneously. Unsynchronized broadcast transmissions may also take advantage of the same suppression logic noted above, making it density aware. Synchronized unicast transmissions do not, however, since neighboring devices in independently defined hopping schedules will not overhear the beacon transmission.

FIG. 14 illustrates an example simplified procedure 1400 for efficient network discovery in a frequency hopping communication network in accordance with one or more embodiments described herein, e.g., for the particular example of selecting a transmission type. The procedure 1440 starts in step 1402, and continues to step 1404 where a device receives a first beacon request. In step 1406, the length of the given time period is set to a minimum length and a new time period is initiated. In step 1408, the number of received beacon requests is incremented, and until the transmission time is reached in step 1410, the device waits to see if additional requests are received in step 1412 in order to further increment the number of requests. Once transmission time is reached in step 1410, then in step 1414 the node determines the number of received beacon requests within the given time period, and adapts a type of responsive beacon message transmission in step 1416 based on the number of received beacon requests within the given time period, i.e., synchronized unicast responsive beacon messages when below the threshold, and unsynchronized broadcast responsive beacon messages when above the threshold. As such, in step 1418, the device transmits the responsive beacon message(s) based on the type of responsive beacon message transmission, and the procedure 1400 ends in step 1420.

According to the second component of the illustrative techniques herein, regarding beacon request message transmissions, devices within a frequency hopping network occasionally transmit a beacon request messages to solicit beacon transmissions from neighboring devices, as noted above. The beacon request message includes information about the transmitter's unicast schedule such that neighboring devices can unicast responsive beacon messages using synchronized unicast transmissions. Generally, devices herein actively searching for networks transmit beacon request messages using unsynchronized broadcast transmissions. The beacon request transmission algorithm described below with reference to FIGS. 15A-15B is enabled whenever a device wishes to actively search for a neighboring network.

Figure 15A:
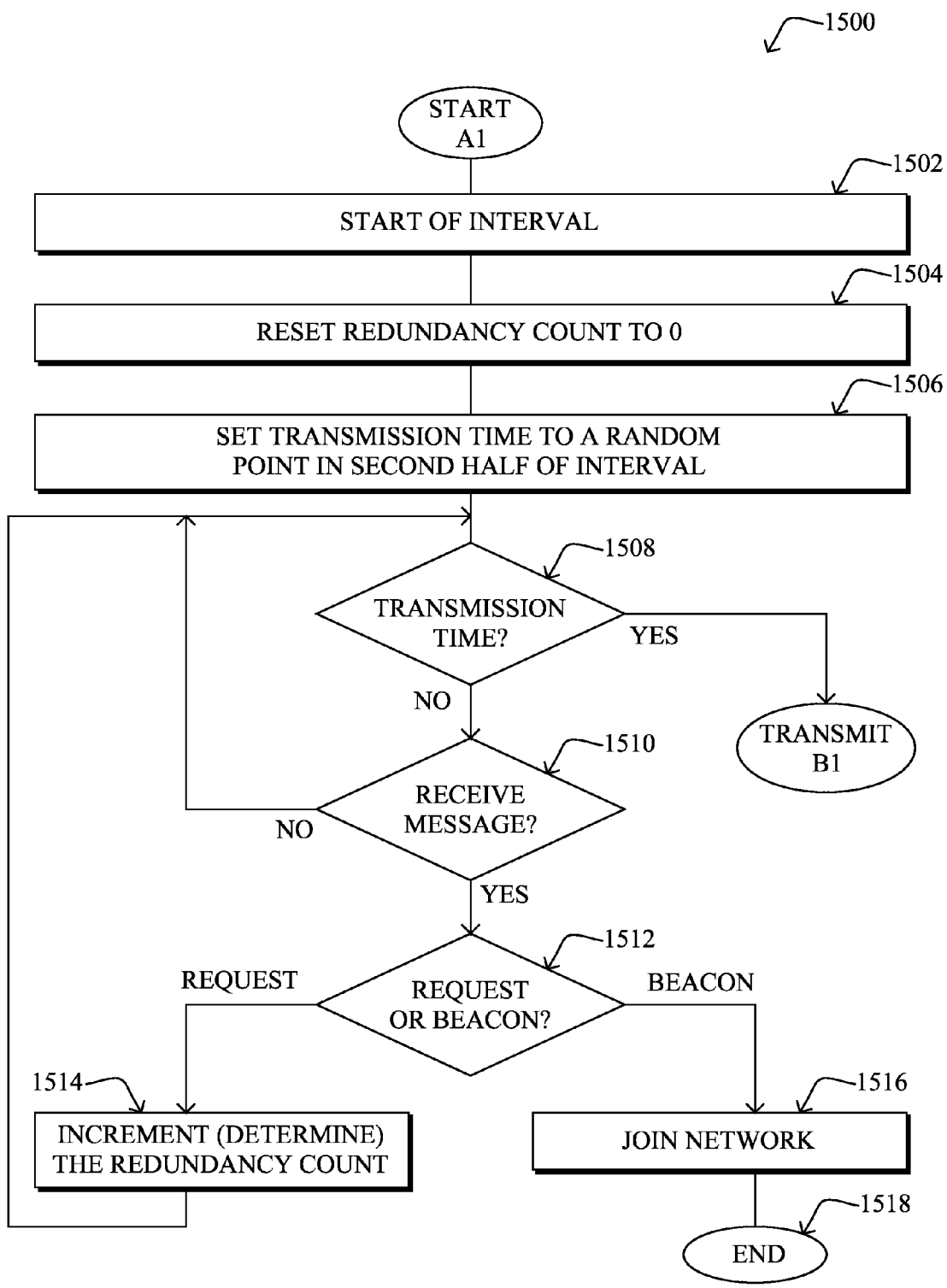
FIGS. 15A-15B illustrate an example simplified procedure 1500 for efficient network discovery in a frequency hopping communication network in accordance with one or more embodiments described herein, e.g., from the perspective of a device attempting to locate and join a network.
Figure 15B:
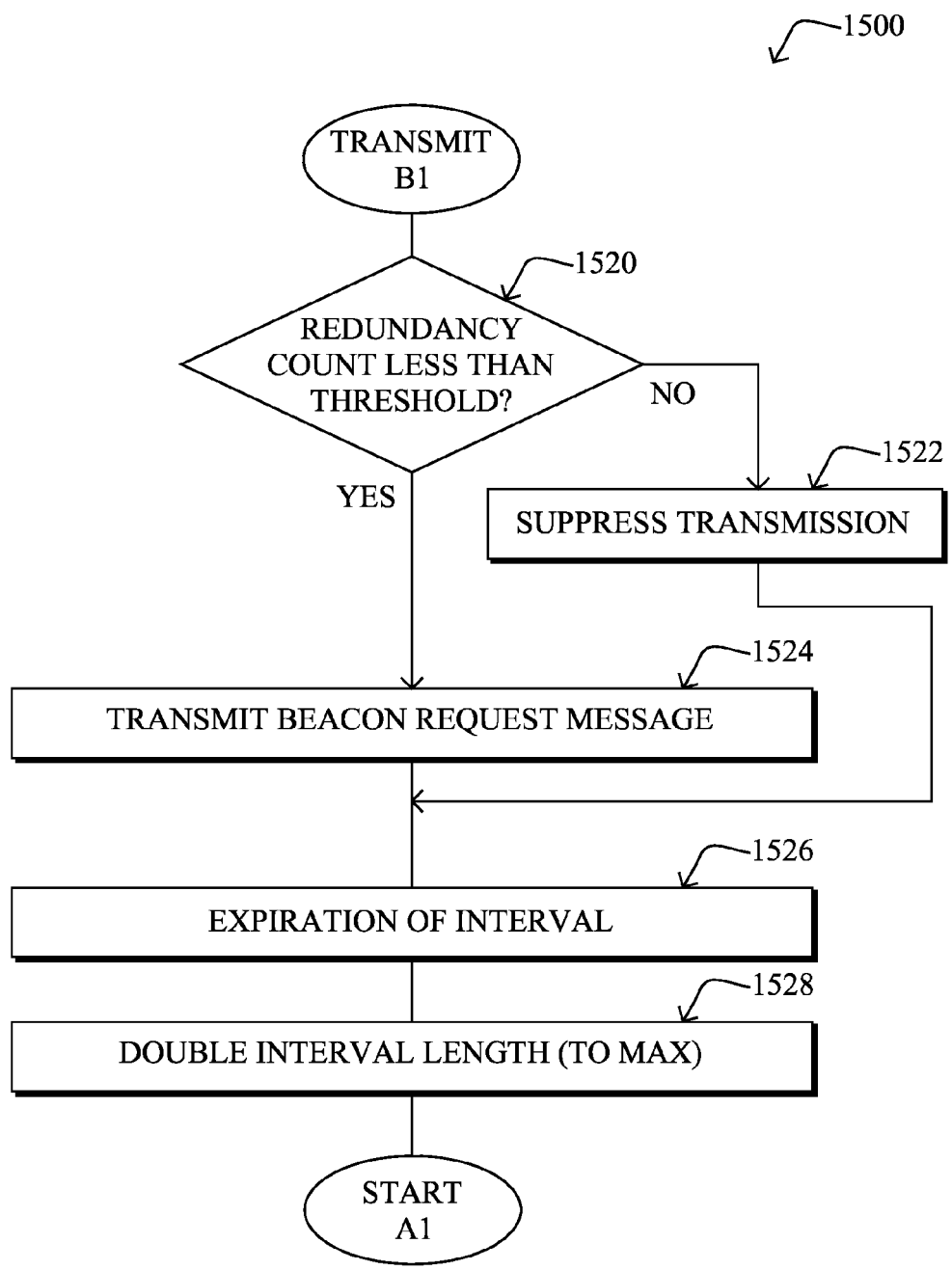

In particular, FIGS. 15A-15B illustrate an example simplified procedure 1500 for efficient network discovery in a frequency hopping communication network in accordance with one or more embodiments described herein, e.g., from the perspective of a device attempting to locate and join a network. In particular, when starting in interval in step 1502, a redundancy count c is reset to 0 in step 1504, and the transmission time t is set to a random point in the second half of the interval (i.e., greater than or equal to I/2 and less than I) in step 1506, similar to procedure 1300 above. Until it is transmission time in step 1508, whenever a message is received in step 1510, it is generally either another request, or a beacon message, as determined in step 1512. When receiving a beacon request message from a neighboring node in the same network in step 1514, the corresponding redundancy count c is incremented, and the procedure again awaits the transmission time in step 1508. Alternatively, if the message is a beacon message, the device may correspondingly join the network in step 1516, and the procedure ends in step 1518 (e.g., and may itself begin to transmit beacons as described above, accordingly).

As shown in FIG. 15B, at transmission time t ("transmit B1"), the device transmits a beacon request message if and only if the redundancy counter c is less than the redundancy constant k. That is, in step 1520, the device determines whether the redundancy count less than the threshold, and if not, suppresses transmission in step 1522, and only transmits the request in step 1524 if it is below the threshold, accordingly. When the interval I expires in 1526, the interval length may be increased/doubled in step 1528 (up to Imax), and the procedure returns to "start A1" of FIG. 15A.

The beacon request suppression mechanism herein thus serves to eliminate wasteful beacon request transmissions that would otherwise occur if no suppression was used, while increasing the interval as noted reduces the rate of beacon request transmission over time to reduce channel utilization whenever the device takes longer than expected to find neighboring networks. In other words, the technique described in procedure 1500 suppresses transmission of the beacon request based on a density-aware redundancy count of other beacon requests from neighboring devices, and adapts the interval by increasing the length of the interval (up to a configured maximum interval length) in response to expiration of a particular interval with an unanswered beacon request.

It should be noted that while certain steps within procedures 1100-1500 may be optional as described above, the steps shown in FIGS. 11A-15B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1500 are described separately, certain steps from each procedure may be incorporated into each other procedure, and the procedures are not meant to be mutually exclusive.

The novel techniques described herein, therefore, provide for optimized network discovery in a frequency hopping network. For instance, the techniques herein address ability to perform network discovery efficiently, especially as network size grows (e.g., for AMI networks, where network densities can be range from small number of nodes to 5,000 nodes or more). In particular, according to one or more embodiments herein, the techniques may:

1) Quickly disseminate new network-wide parameters for use with the network join process and responds to beacon requests while minimizing resource utilization in the steady state by using an adaptive timer;
2) Reduce wasteful beacon transmissions by using a suppression mechanism to eliminate redundant transmissions that would otherwise occur when using a fixed transmission period on all nodes;
3) Reduce wasteful beacon request transmissions by using a suppression mechanism to eliminate redundant transmissions that would otherwise occur; and
4) Allow using synchronized unicast transmissions when that is more efficient than unsynchronized broadcast transmissions in responding to beacon requests.

While there have been shown and described illustrative embodiments that provide for optimized network discovery in a frequency hopping network, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared media networks and/or protocols using frequency hopping, such as certain PLC protocols. Also, while the description above relates to packets, the techniques may be equally applicable to non-packetized transmissions. Moreover, while the above description references LLNs and AMI networks, these are merely example types of networks that may benefit from one or more techniques described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving one or more beacon requests at a device in a frequency hopping communication network;
    determining a number of received beacon requests within a given time period;
    adapting a type of responsive beacon message transmission based on the number of received beacon requests within the given time period, wherein the number being below a threshold results in synchronized unicast responsive beacon message transmission type, and wherein the number being above the threshold results in unsynchronized broadcast responsive beacon message transmission type;
    transmitting one or more responsive beacon messages from the device based on the type of responsive beacon message transmission,
    transmitting one or more unsolicited beacon messages from the device; and
    suppressing unsolicited beacon message transmission based on a density-aware redundancy count of other unsolicited beacon message transmissions from neighboring devices in the communication network.

2. The method as in claim 1, further comprising:
    determining a stability of the communication network; and
    adapting an interval of unsolicited beacon message transmission from the device based on stability of the network.

3. The method as in claim 1, further comprising:
    transmitting one or more unsolicited beacon messages from the device;
    determining a stability of the communication network; and
    adapting an interval of unsolicited beacon message transmission from the device based on stability of the network.

4. The method as in claim 1, further comprising, in response to receiving a beacon request when a length of the given time period is not currently set to the minimum length:
    setting the length of the given time period to the minimum length; and
    starting a new time period as the given time period during which the number of received beacon requests is determined, wherein transmitting the one or more responsive beacon messages is at a particular chosen time prior to expiration of the new time period.

5. The method as in claim 1, wherein transmitting comprises:
    transmitting one or more unsynchronized broadcast responsive beacon messages from the device; and
    suppressing the transmitting one or more unsynchronized broadcast responsive beacon messages from the device based on a density-aware redundancy count of other unsynchronized broadcast responsive beacon messages from neighboring devices in the communication network.

6. An apparatus, comprising:
    a processor;
    a transceiver configured to communicate in a frequency hopping communication network; and
    a memory configured to store one or more processes executable by the processor, the one or more processes configured to:
        transmit one or more responsive beacon messages from the device based on an adaptive type of responsive beacon message transmission based on a number of received beacon requests within a given time period, wherein the number being below a threshold results in synchronized unicast responsive beacon message transmission type, and wherein the number being above the threshold results in unsynchronized broadcast responsive beacon message transmission type;
        suppress unsolicited beacon message transmission during a given time period based on a density-aware redundancy count of other unsolicited beacon message transmissions from neighboring devices in the communication network during the given time period; and
        transmit one or more unsolicited beacon messages according to an adaptive interval of the unsolicited beacon message transmission based on stability of the network.

7. The apparatus as in claim 6, wherein the one or more processes when executed are further configured to:
    in response to receiving a beacon request when a length of the given time period is not currently set to the minimum length: set the length of the given time period to the minimum length, and start a new time period as the given time period during which the number of received beacon requests is determined, wherein transmission of the one or more responsive beacon messages is at a particular chosen time prior to expiration of the new time period.

8. The apparatus as in claim 6, wherein suppressing unsolicited beacon message transmission further includes:
    resetting, at a start of the given time period, the redundancy count to 0;
    incrementing the redundancy count in response to each received unsolicited beacon message containing a same network information version as a pending unsolicited beacon message to be transmitted; and
    suppressing unsolicited beacon message transmission by transmitting the pending unsolicited beacon message for the given time period if and only if the redundancy count is less than a given threshold value.

9. The apparatus as in claim 6, wherein the one or more processes are further configured to:
    increase a length of the adaptive interval in response to expiration of a particular interval; and decrease the length of the adaptive interval and start a new interval in response to receiving, from a neighboring device in the communication network, an unsolicited beacon message transmission that contains a different network information version as a pending unsolicited beacon message to be transmitted.

10. The apparatus as in claim 6, wherein the one or more processes are further configured to:
suppress transmission of a beacon request to join the communication network based on a density-aware redundancy count of other beacon requests from neighboring devices, and to transmit one or more beacon requests at an adaptive interval, wherein the interval increases in response to each unanswered beacon request.

* * * * *